(12) United States Patent
Manchester et al.

(10) Patent No.: US 9,945,097 B2
(45) Date of Patent: Apr. 17, 2018

(54) TRENCH APPARATUS WITH LEVELING MEANS

(71) Applicant: IHC Engineering Business LTD, Sliedrecht (NL)

(72) Inventors: Ralph Manchester, Rowlands Gill (GB); Stephen Wilkinson, Newcastle (GB)

(73) Assignee: IHC ENGINEERING BUSINESS LIMITED, Sliedrecht (NL)

( * ) Notice: Subject to any disclaimer, the term of this patent is extended or adjusted under 35 U.S.C. 154(b) by 0 days.

(21) Appl. No.: 15/111,303

(22) PCT Filed: Jan. 23, 2015

(86) PCT No.: PCT/GB2015/050165
§ 371 (c)(1),
(2) Date: Jul. 13, 2016

(87) PCT Pub. No.: WO2015/110834
PCT Pub. Date: Jul. 30, 2015

(65) Prior Publication Data
US 2016/0333549 A1    Nov. 17, 2016

(30) Foreign Application Priority Data

Jan. 24, 2014    (GB) .................................. 1401236.3

(51) Int. Cl.
*E02F 9/02*    (2006.01)
*E02F 5/02*    (2006.01)
(Continued)

(52) U.S. Cl.
CPC .......... *E02F 9/028* (2013.01); *B60G 17/0165* (2013.01); *E02F 5/02* (2013.01);
(Continued)

(58) Field of Classification Search
CPC . B60G 3/06; B60G 7/008; B60G 9/02; B60G 17/005; B60G 17/0165;
(Continued)

(56) References Cited

U.S. PATENT DOCUMENTS 1,577,761 A * 3/1926 Ruth .................... B62D 55/084
180/9.48
3,430,790 A    3/1969 Beltrami
(Continued)

FOREIGN PATENT DOCUMENTS

CN    103264629 A    8/2013
DE    2937205 A1    3/1981
(Continued)

*Primary Examiner* — Robert E Pezzuto
(74) *Attorney, Agent, or Firm* — Nexsen Pruet, PLLC; E. Eric Mills

(57) ABSTRACT

The invention provides a trenching apparatus and a method of using a trenching apparatus. The trenching apparatus (100) may include a main body portion (10), trench cutting equipment (50) depending from the main body portion, at least two ground contacting units (16) arranged on opposed sides of the main body portion and on which the main body portion is supported, each of the ground contacting units being connected to the main body portion by a respective independently operable suspension assembly (20), the respective suspension assemblies being configured to compensate for unevenness of the ground thereby to maintain the trench cutting equipment in a desired angular orientation with respect to the vertical.

31 Claims, 4 Drawing Sheets

(51) Int. Cl.
*E02F 5/10* (2006.01)
*B60G 17/0165* (2006.01)
*E02F 5/04* (2006.01)
*E02F 5/06* (2006.01)
*E02F 5/08* (2006.01)
*E02F 5/14* (2006.01)

(52) U.S. Cl.
CPC ............. *E02F 5/025* (2013.01); *E02F 5/04* (2013.01); *E02F 5/06* (2013.01); *E02F 5/08* (2013.01); *E02F 5/104* (2013.01); *E02F 5/145* (2013.01); *E02F 9/026* (2013.01); *B60G 2400/821* (2013.01); *B60G 2800/912* (2013.01)

(58) Field of Classification Search
CPC ........ B62D 13/18; B62D 23/62; B62D 23/36; B62D 49/08; B62D 55/084; B62D 55/116; E02F 3/30; E02F 3/22; E02F 3/425; E02F 3/181; E02F 3/188; E02F 5/006; E02F 5/282; E02F 9/10; E02F 9/024; E02F 9/028; E02F 9/0841; E02F 9/085; E02F 9/121; E02F 9/20; E02F 9/205; E02F 5/02; E02F 5/104; E02F 5/025; E02F 5/04; E02F 5/06; E02F 5/08; E02F 5/145; E02F 9/026

USPC ......... 37/307, 309, 313, 337, 338, 190, 348; 180/4.1, 9.52, 9.54, 41; 212/302; 280/6, 280/155, 124.112; 414/694, 695, 687
See application file for complete search history.

(56) References Cited

U.S. PATENT DOCUMENTS

| | | | |
|---|---|---|---|
| 3,892,079 A | | 7/1975 | Hirano et al. |
| 4,360,311 A | * | 11/1982 | Dufour ............... E02F 9/024 180/41 |
| 5,199,193 A | | 4/1993 | Akiba et al. |
| 5,960,570 A | * | 10/1999 | Satzler ............... E02F 3/181 37/190 |
| 6,012,724 A | * | 1/2000 | Pitkanen ............. B60G 3/06 180/41 |

FOREIGN PATENT DOCUMENTS

| | | |
|---|---|---|
| EP | 0821109 A1 | 1/1998 |
| EP | 1167636 A | 1/2002 |
| GB | 2495950 A | 5/2013 |
| JP | 5944436 A | 7/2016 |
| NL | 9201058 A | 1/1994 |

* cited by examiner

TRENCH APPARATUS WITH LEVELING MEANS

CROSS REFERENCE TO RELATED APPLICATIONS

This application is a 35 U.S.C. § 371 U.S. national phase entry of International Application No. PCT/GB2015/050165 having an international filing date of Jan. 23, 2015, which claims the benefit of Great Britain Application No. 1401236.3 filed Jan. 24, 2014, each of which is incorporated herein by reference in its entirety.

The present invention relates to an apparatus for forming a trench in a portion of ground or land. More especially, the present invention relates to an apparatus for forming a trench in the bed of a body of water, such as the bed of a lake or the seabed. Trenches are commonly required for burying pipelines or cables, in particular underwater pipelines or cables, in order to protect the pipeline or cable from damage. A variety of trenching apparatus suitable for use in an underwater environment is known, such apparatus necessarily having adaptions and differences as compared to apparatus intended for use on land, in order to meet the particular requirements of underwater use.

Hereinafter "subsea" is used to refer to environments beneath the sea or beneath a lake, and "seabed" is used to refer to the bed of a lake or the seabed.

BACKGROUND

Numerous different trenching apparatus are known. Some representative examples include those described in U.S. Pat. No. 3,099,098, DE 4 243696, WO99/54556, WO20013/088167, GB 2 495 950, EP 1167636 and NL 9201058.

EP 1167636 describes a trenching apparatus with a centrally mounted trench cutting device. The apparatus is mounted on wheels or skids via respective four-bar suspension assemblies which can be extended laterally from a main body of the apparatus.

NL9201058 describes a trenching apparatus for underwater trenches. The apparatus has a main body to which a trench cutting tool is mounted. The main body is mounted on four endless track units. Each endless track unit can adjusted relative to the main body portion for height, direction and lateral spacing.

Problems can occur with trenching apparatus in dealing with uneven topography of the ground or land in which the trench is to be cut. Herein "land" or "ground" can refer to the seabed when the trenching apparatus is configured for underwater use. Such uneven topography can include slopes which the trenching apparatus must traverse and local features of the land (e.g. seabed) which can project upwardly in the path of the trenching apparatus, such as ridges, boulders and the like.

Such uneven topography can cause difficulties in relation to the trench cutting equipment of the trenching apparatus. In some typical configurations, the trench cutting equipment is mounted to the trenching apparatus in such a way that it can be raised and lowered in a vertical plane, normally so that the trench cutting equipment can be moved between stowed and use positions, for example. However, the trench cutting equipment can typically otherwise be mounted in fixed angular relation to a main body part of the trenching apparatus. It follows that if the angular position of the main body portion changes, the angular orientation of the trench cutting equipment is also changed. Such change in angular orientation of the trench cutting equipment can have significant consequences in relation to the trench being cut. In particular, changes in the angle of orientation of the trench cutting equipment can cause the walls of the trench as cut to be formed at an angle other than a desired cutting angle. Commonly, the desired cutting angle is vertical. Such departure from the desired cutting angle (in particular departure form a vertical cutting angle) can lead to a reduction in, or loss of, stability of the walls, so that the trench can collapse.

In other known devices, such as that described in WO99/54556, the trench cutting equipment can be mounted to allow movement about a nominally longitudinal horizontal axis relative to the main body portion of the trenching apparatus. In analogous manner, U.S. Pat. No. 3,099,098 describes a trenching apparatus having trench cutting equipment in angularly fixed relation to a main body of the apparatus. The main body is mounted to a chassis, the main body being moveable with respect to the chassis about a longitudinal horizontal axis. In these prior art constructions, some compensation for angular displacement of the main body portion can be achieved and the trench cutting equipment can generally be maintained in a nominally vertical orientation. However, such arrangements do not compensate for lateral displacement of the trench cutting equipment which can occur when the main body portion of the trenching apparatus changes its angular orientation.

Some embodiments of the present invention seek to address one or more of the above problems. Embodiments of the present invention can provide a trenching apparatus which can accommodate variations in the topography of the ground, notably the seabed, to better maintain a desired angular orientation of the trench cutting equipment (in particular, a vertical orientation).

Embodiments of the present invention can provide a trenching apparatus which can accommodate variations in the topography of the ground, notably the seabed, to avoid, reduce or minimise unintended or undesired lateral displacement of the trench cutting equipment from an intended trenching course or path.

Embodiments of the invention can provide a trenching apparatus which can accommodate variations in the topography of the ground, notably the seabed, such that angular displacement of a main body portion of the trenching apparatus, to which trench cutting equipment is mounted, is minimised, reduced or prevented.

Particular embodiments of the invention can provide a trenching apparatus which can in effect pivot substantially about its virtual centre point in order to maintain a desired angular orientation to the trench cutting equipment.

Embodiments of the apparatus of the invention can include a suspension assembly arranged between a main body of the apparatus and a ground contacting unit on which the apparatus stands. Respective suspension assemblies can be configured such that the trenching apparatus (or at least the main body portion thereof) can in effect pivot substantially about its virtual centre point in order substantially to maintain a desired angular orientation to the trench cutting equipment irrespective of variations in the topography of the underlying ground. The desired angular orientation of the trench cutting equipment can be a nominally vertical orientation. The desired orientation of the trench cutting equipment can be maintained by maintaining a desired orientation of a main body portion of the trenching apparatus, to which the trench cutting equipment is mounted.

Embodiments of the present invention can provide a trenching apparatus including a virtual pivot system, and such system can have a pivot centre substantially on the centre line of the trench cutting equipment. In some preferred constructions, the centre line of the trench cutting equipment can be coincident with the centre line of the trenching apparatus.

In particular embodiments of the invention, the virtual pivot, as can be embodied by the respective suspension assemblies, can preferably be optimised to:

keep the main body portion angular displacement minimal with respect to the direction due to the acceleration due to gravity and/or minimise the distance variation between the tool ground engagement point and the ground contacting units (that is, to minimise lateral displacement) and/or to allow the ground contacting unit rotate to keep the ground contacting unit in a condition in which the ground contacting face thereof is maintained substantially parallel to the ground on which the ground contacting unit stands.

BRIEF SUMMARY OF THE DISCLOSURE

In accordance with a first aspect of the present invention there is provided a trenching apparatus configured for cutting a trench extending downwardly from a ground surface, the apparatus comprising a main body portion, trench cutting equipment depending from the main body portion, at least two ground contacting units arranged on opposed sides of the main body portion and on which the main body portion is supported, each said ground contacting unit being connected to the main body portion by a respective independently operable suspension assembly, the respective suspension assemblies being configured to compensate for unevenness of the ground thereby to maintain the trench cutting equipment in a desired angular orientation with respect to the vertical, wherein the independent suspension assembly has a pivot centre arranged substantially on a plane which longitudinally bisects the trench cutting equipment, said plane being a nominally vertical plane when the trenching apparatus stands on flat horizontal ground.

In some preferred embodiments the pivot centre of each ground contacting unit can be arranged substantially at the location where the trenching cutting equipment intersects the ground surface. In particular, the pivot centre of the ground contacting surface of the ground contacting unit can be arranged substantially at the location where the trenching cutting equipment intersects the ground surface.

In some preferred embodiments the respective suspension assemblies can be configured substantially to prevent lateral displacement, in particular, lateral angular displacement, of the trench cutting equipment when the apparatus traverses uneven ground.

In some preferred embodiments said trenching apparatus can be an underwater trenching apparatus configured for cutting a trench in the bed of a body of water.

In some preferred embodiments said desired angular orientation of the trench cutting equipment can be a nominally vertical orientation.

In some preferred embodiments the trench cutting equipment can be mounted in fixed relation, with respect to lateral angular displacement, to said main body portion of the trenching apparatus and said respective independent suspension assemblies can be configured to maintain said main body portion in a desired angular orientation with respect to the horizontal thereby to maintain the trench cutting equipment in said desired angular orientation.

In some preferred embodiments said desired angular orientation of the main body portion can be substantially horizontal.

In some preferred embodiments the trenching apparatus can further comprise an actuator mounted to the main body portion and to an element of the suspension assembly. Said actuator can be configured to adjust the position of the suspension assembly, and consequently of the ground contacting unit with respect to the main body portion, thereby to compensate for said unevenness of the ground.

In some preferred embodiments the trenching apparatus can further comprise electronic control apparatus operative to effect adjustment of the said actuator.

In some preferred embodiments the trenching apparatus can further comprise one or more measurement devices. Said measurement devices can determine a positional condition of the apparatus and/or the presence and characteristics of local features of the ground over which the apparatus is passing or will pass. Said electronic control apparatus can be operative to effect adjustment of at least one said actuator responsive to one or more outputs received from said one or more measurement devices.

In some preferred embodiments the suspension assembly can comprise a first suspension arm arranged in fixed relation to the main body portion and including first and second pivot points, a second suspension arm arranged in fixed relation to the ground contacting unit and including first and second pivot points, a first suspension pivot arm pivotally attached to the respective first pivot points of the first and second suspension arms and second suspension pivot arm pivotally attached to the respective second pivot points of the first and second suspension arms. In some preferred embodiments the first and second suspension arms can extend laterally outwardly from the main body portion. For example the first and second suspension arms can extend substantially perpendicularly outwardly from the main body portion. The mounting of the respective first and second suspension arms can be such that they can move only in a substantially vertical plane (when the attitude of the main body portion is substantially horizontal).

In some preferred embodiments the ground contacting units can comprise endless track units configured to transmit tractive effort to move the trenching apparatus in use.

In some preferred embodiments each ground contacting unit can include a ground contacting surface. The independent suspension assembly can configure the lateral angle of inclination of the ground contacting unit such that the lateral angle of inclination of the ground contacting surface is substantially equal to the angle of inclination of the ground surface with which the ground contacting surface is in contact.

In some preferred embodiments the trench cutting equipment can be selected from one or more jetting tools, one or more chain cutters, one or more auger, one or more rockwheels and a non-continuous cutter such as a backhoe. In some preferred arrangements, the trench cutting equipment can be a rockwheel or chain cutter. In some preferred arrangements, the apparatus can be configured to execute forward motion while the trench cutting equipment is engaged in trench cutting.

In some preferred embodiments the unevenness of the ground can be a lateral slope, with respect to a longitudinal forward direction of the apparatus.

In some preferred embodiments the unevenness of the ground thereby can be a local ground feature or formation such as a rock, ridge, boulder or the like.

According to a second aspect of the present invention there is provided a method of cutting a trench in a body of ground extending downwardly from the ground surface, the method comprising:

cutting said trench with a trenching apparatus comprising a main body portion, trench cutting equipment depending from the main body portion, at least two ground contacting units arranged on opposed sides of the main body portion and on which the main body portion is supported, each said ground contacting unit being connected to the main body portion by a respective independently operable suspension assembly, the respective independent suspension assemblies having a pivot centre arranged substantially on a plane which longitudinally bisects the trench cutting equipment, said plane being a nominally vertical plane when the trenching apparatus stands on flat horizontal ground and while cutting said trench, adjusting the respective suspension assemblies to compensate for unevenness of the ground thereby to maintain the trench cutting equipment in a desired angular orientation with respect to the vertical.

In some preferred embodiments of a method according the invention the pivot centre of each the ground contacting unit can be arranged substantially at the location where the trenching cutting equipment intersects the ground surface. In particular, the pivot centre of the ground contacting surface of the ground contacting unit can be arranged substantially at the location where the trenching cutting equipment intersects the ground surface.

In some preferred embodiments of a method according the invention said adjusting can, during trench cutting operations, be a substantially continuous adjusting in response to variations in the topography of the ground in which the trench is being, or is to be, cut.

In some preferred embodiments of a method according the invention said adjusting of the respective suspension assemblies can substantially prevent lateral displacement, in particular lateral angular displacement, of the trench cutting equipment when the apparatus traverses uneven ground.

In some preferred embodiments of a method according the invention said trench can be a trench in the bed of a body of water.

In some preferred embodiments of a method according the invention said adjusting of the respective suspension assemblies can be effective to maintain the trench cutting equipment in a nominally vertical orientation.

In some preferred embodiments of a method according the invention the trench cutting equipment can be mounted in fixed relation, with respect to lateral angular displacement, to said main body portion of the trenching apparatus and said respective independent suspension assemblies can be adjusted to maintain said main body portion in a desired angular orientation with respect to the horizontal thereby to maintain the trench cutting equipment in their said desired angular orientation.

In some preferred embodiments of a method according the invention said desired angular orientation of the main body portion can be substantially horizontal.

In some preferred embodiments of a method according the invention the apparatus can further comprise an actuator mounted to the main body portion and to an element of the suspension assembly, and the method can further comprise operating said actuator to adjust a position of the suspension assembly, and consequently of the ground contacting unit, with respect to the main body portion, thereby to compensate for said unevenness of the ground.

In some preferred embodiments of a method according the invention the apparatus can further comprise electronic control apparatus and said electronic control apparatus can operatively cause adjustment of the said actuator.

In some preferred embodiments of a method according the invention, the apparatus can further comprise one or more measurement devices. The measurement devices can be operable to determine a positional condition of the apparatus and/or the presence and characteristics of local features of the ground over which the apparatus is passing or will pass, and said electronic control apparatus can cause adjustment of at least one said actuator responsive to one or more outputs received from said one or more measurement devices.

In some preferred embodiments of a method according the invention each ground contacting unit can include a ground contacting surface and the independent suspension assembly can configure the lateral angle of inclination of the ground contacting unit such that the lateral angle of inclination of the ground contacting surface is substantially equal to the angle of inclination of the ground surface with which the ground contacting surface is in contact.

In some preferred embodiments of a method according the invention the trench cutting equipment can be selected from one or more jetting tools, one or more chain cutters, one or more auger, one or more rockwheels and a non-continuous cutter such as a backhoe. In some preferred embodiments, the trench cutting equipment can be a rockwheel or chain cutter. In some preferred embodiments, the apparatus can be configured to execute forward motion while the trench cutting equipment is engaged in trench cutting.

In some preferred embodiments of a method according the invention the unevenness of the ground can be a lateral slope, with respect to a longitudinal forward direction of the apparatus when cutting a trench.

In some preferred embodiments of a method according the invention the unevenness of the ground can be a local ground feature or formation such as a rock, ridge, boulder or the like.

According to a further aspect of the present invention there is provided a trenching apparatus comprising a main body portion, trench cutting equipment depending from the main body portion, at least two ground contacting units arranged on opposed sides of the main body portion and on which the main body portion is supported, each said ground contacting unit being connected to the main body portion by a respective independently operable suspension assembly, the respective suspension assemblies being configured to compensate for unevenness of the ground thereby to maintain the trench cutting equipment in a desired angular orientation with respect to the vertical.

In some preferred embodiments the independent suspension assembly can have a pivot centre arranged substantially on a plane which longitudinally bisects the trench cutting equipment, said plane being a nominally vertical plane when the trenching apparatus stands on flat horizontal ground.

According to another aspect of the present invention there is provided a method of cutting a trench in a body of ground the method comprising:

providing a trenching apparatus comprising a main body portion, trench cutting equipment depending from the main body portion, at least two ground contacting units arranged on opposed sides of the main body portion and on which the main body portion is supported, each said ground contacting unit being connected to the main body portion by a respective independently operable suspension assembly, adjusting the respective suspension assemblies to compensate for unevenness of the ground thereby to maintain the trench cutting equipment in a desired angular orientation with respect to the vertical.

In some preferred embodiments of the method the independent suspension assembly can have a pivot centre arranged substantially on plane which longitudinally bisects the trench cutting equipment, said plane being a nominally vertical plane when the trenching apparatus stands on flat horizontal ground.

BRIEF DESCRIPTION OF THE DRAWINGS

Embodiments of the invention are further described hereinafter with reference to the accompanying drawings, in which.

DETAILED DESCRIPTION

Figure 1:
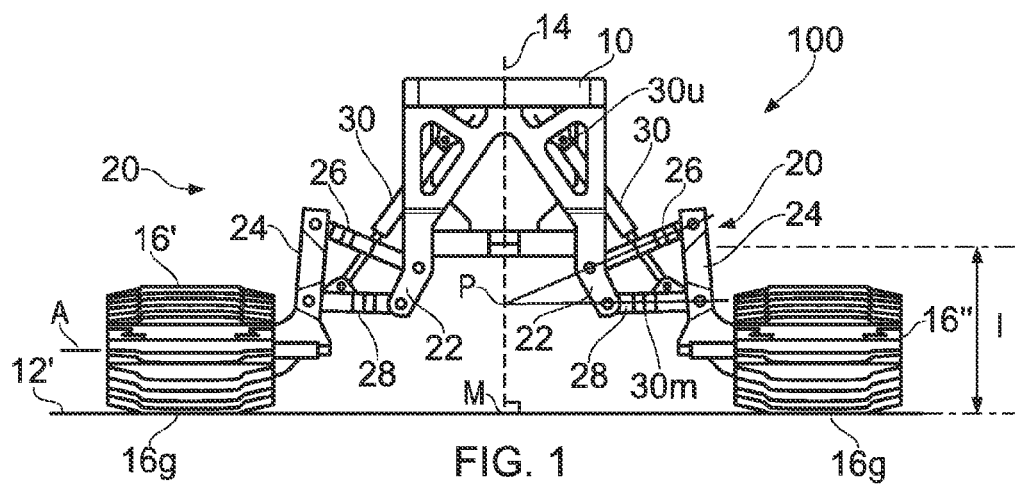
FIG. 1 is a schematic front view of a trenching apparatus, suitably an underwater trenching apparatus according to one embodiment of the invention, when positioned on substantially level ground.

Referring now to the drawings, the trenching apparatus 100 is preferably an underwater trenching apparatus. The trenching apparatus 100 can comprise a main body portion 10. Main body portion 10 can comprise a primary structural element of the trenching apparatus 100 to which auxiliary equipment necessary or desirable for the operation of the trenching apparatus, such as control and power equipment, typically is mounted.

Main body portion 10 can also form a mounting location for trench cutting equipment 50 of the trenching apparatus, the trench cutting equipment being the apparatus and components which, in use, displace material such as rock and soil to form a trench in the seabed 12. In some preferred embodiments the trench cutting equipment is equipment configured for underwater trench cutting. Trench cutting equipment 50 is shown in FIGS. 5a and 5b and in schematic form only in FIG. 3 but should be understood to be also present in FIGS. 1, 2 and 4. The construction of trench cutting equipment per se is well known to those of skill in the art and need not be described in detail. Preferred forms of trench cutting equipment can include equipment which is adapted or configured for cutting a trench in the seabed.

Examples of suitable trench cutting equipment can include equipment which typically can operate continuously for cutting a given length of trench such as one or more jetting tools, one or more chain cutters, one or more augers, and one or more rockwheels and equipment which can operate discontinuously such as backhoes and the like. In some embodiments of the present invention, continuously operating equipment is preferred. In some embodiments of the present invention, chain cutters or rockwheels are particularly preferred.

In some preferred embodiments, trench cutting equipment 50 can be mounted to main body portion 10 in such a way as to lie in a longitudinal plane including the longitudinal centre line 14 of the trenching apparatus 100. Such longitudinal plane is a nominally vertical plane when said main body portion is nominally horizontal, such as when the apparatus 100 stands on horizontal, flat, land. The trench cutting equipment can, in some preferred variations of these embodiments, be raised and lowered in said longitudinal plane including the centre line 14 of the trenching apparatus 100 in order to vary the trench cutting depth and, in some constructions, to move the equipment 50 between stowed and use positions.

In some constructions, according to some less preferred embodiments of the invention, the trench cutting equipment can be mounted to main body portion 10 in such a way as to lie in a longitudinal vertical plane which is laterally offset from the longitudinal centre line 14 of the trenching apparatus 100. More particularly said longitudinal vertical plane which is laterally offset from the longitudinal centre line can be a longitudinal (with respect to the apparatus 100) vertical bisector of the trench cutting equipment 50, when said main body portion is nominally horizontal, such as when the apparatus 100 stands on horizontal, flat, land. The trench cutting equipment can, in some variations of these embodiments, be raised and lowered in said vertical longitudinal plane offset from the centre line 14 of the trenching apparatus 100 in order to vary the trench cutting depth and, in some constructions, to move the equipment 50 between stowed and use positions.

The trench cutting equipment 50 according to the preceding embodiments can—when performing trench cutting operations—otherwise be angularly fixed in relation to the main body portion 10. Thus, the equipment 50 can be confined to the vertical longitudinal plane including, or laterally offset from, the longitudinal centre line 14 of the apparatus 100.

From the above it follows that if, in use for trench cutting operations, the lateral angle of inclination of the main body portion 10 changes, such as a result of changes in the lateral angle inclination of the ground (in particular the seabed) in which the trench is cut (i.e. a lateral slope of the ground), the lateral angle of inclination of the trench cutting equipment 50 will experience a corresponding change with the consequence that the angle at which the trench is cut departs from the vertical. Specifically, the side walls of the trench when cut are not then vertical, leading to instability of the trench.

Some embodiments of the present invention seek to avoid or minimise such changes in lateral angle of inclination of the trench cutting equipment 50, in particular so that an at least substantially vertical orientation of the trench cutting equipment 50 is maintained. In embodiments of the invention, this can be achieved by avoiding or minimising changes in the lateral angle of inclination of the main body portion 10 to which said trench cutting equipment 50 is mounted. In particular embodiments the main body portion 10 can be maintained in an at least substantially horizontal configuration. In particular, embodiments of the invention can seek to minimise or prevent departure of the angle of a nominally vertical plane including the longitudinal centre line 14 of the apparatus from the vertical. The "nominally vertical plane" refers to a plane which is substantially vertical when said main body portion is nominally horizontal, such as when the apparatus 100 stands on horizontal, flat, land.

Apparatus 100 can further include at least two ground contacting units 16 arranged on opposed sides of the main body portion 10. In the Figures, two such ground contacting units 16' and 16" are shown. In other exemplary configurations four such ground contacting units can be provided, arranged two either side of the main body portion 10, or six such ground contacting units can be provided, arranged three either side of main body portion 10.

In some preferred embodiments, ground contacting units 16 are constructed and configured to transmit tractive effort to move the trenching apparatus 100 in use. In some preferred embodiments, the apparatus, including the ground contacting units, is constructed and configured to execute substantially continuous forward movement during trenching operations, that is, while the trench cutting equipment is actively engaged in cutting a trench. Reverse movement may also advantageously be employed from time to time, for example during adjustment the direction of the direction of the apparatus 100 to follow a desired trenching direction.

The ground contacting units 16 can in some embodiments be steerable relative to the main body portion 10, such that the direction of motion of the apparatus 100 can be adjusted to follow a desired trenching path or course.

In some particularly preferred embodiments, the ground contacting units 16 can comprise endless articulated tracks. Suitable constructional details of endless articulated tracks appropriate for trenching apparatus, including those suitable for subsea trenching apparatus, are well known to those of skill in the art.

In some alternative constructions the ground contacting units are not required to transmit tractive effort and can be configured primarily to facilitate movement of the apparatus 100 over the ground. Examples of suitable such constructions can include un-powered wheels, skids and the like.

Each respective ground contacting unit 16 is connected to main body portion 10 through an independent suspension assembly 20. Main body portion 10 is supported on the ground (e.g. seabed) 12 by the ground contacting units 16 through the suspension assemblies 20.

Each suspension assembly 20 can be configured to comprise a virtual pivot system with its pivot centre substantially in a defined plane of the trenching apparatus 100. In this way, the suspension assemblies can be configured such that the main body portion 10 remains in a substantially horizontal condition (that is, with the nominally vertical plane (as above defined) including the longitudinal centre line 14 of the trenching apparatus lying substantially vertically) even where the underlying seabed 12 has a lateral slope.

Said defined plane can be the longitudinal vertical bisector (as above defined) of said equipment 50. Where, in accordance with some preferred embodiments, the trench cutting equipment is mounted centrally (with respect to the lateral direction) to the main body portion, said longitudinal vertical bisector is coincident with the longitudinal centre line of the apparatus 100. In other constructions, the longitudinal vertical bisector of the trench cutting equipment 50 can be laterally offset from the longitudinal centre line of the apparatus 100.

FIG. 1 illustrates schematically a trenching apparatus according to one embodiment of the invention disposed on ground (seabed) 12' which is substantially horizontal and flat. It can be seen that the main body portion 10 adopts a substantially horizontal condition, such that centre line 14 is substantially vertical. In this condition, trench cutting equipment 50 is also vertically aligned so that, as noted above, a trench with essentially vertical sides can be cut.

It can be noted that with some constructions of trench cutting equipment walls of the trench as cut may, intentionally, be other than vertical. For example, the sides (walls) of the trench as formed can be inclined such that the width of the trench is greater at its top than at its bottom. In such arrangements also, it is desirable that the trench cutting equipment does not depart from its intended substantially vertical configuration, since such departure would result in a departure from the intended angle as cut of the trench sides.

Figure 2:
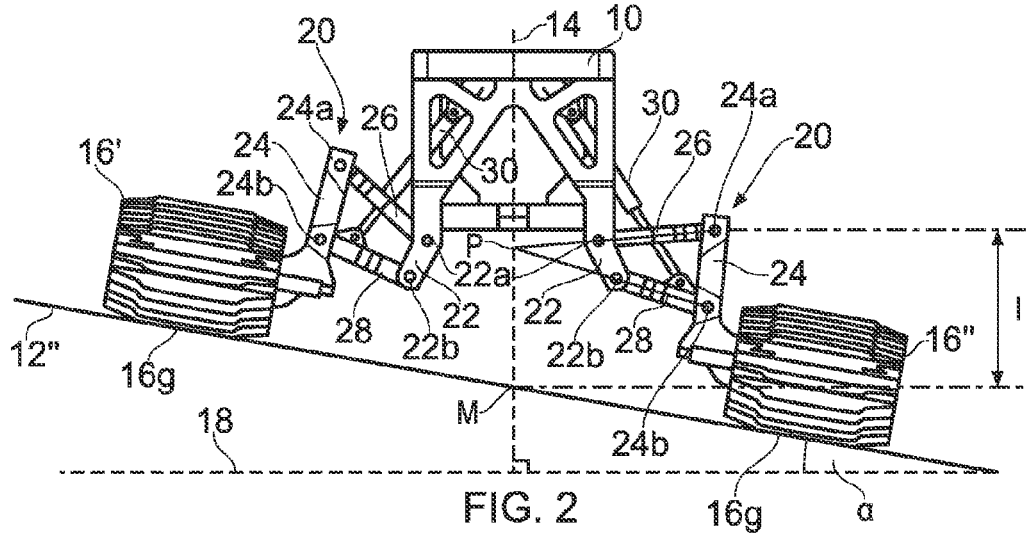
FIG. 2 is a schematic front view of a trenching apparatus of FIG. 1 when positioned on ground having a first lateral inclination.

FIG. 2 illustrates schematically a trenching apparatus according to one embodiment of the invention disposed on ground (seabed) 12'' which has a lateral slope or incline indicated by angle α relative to a nominal horizontal line 18. It can be seen in FIG. 2 that the suspension assemblies 20 act to accommodate the slope of the seabed 12'' so that the main body portion 10 remains in a substantially horizontal condition, with centre line 14 substantially vertical. Trench cutting equipment 50 can thus maintain its substantially vertical orientation.

Figure 3:
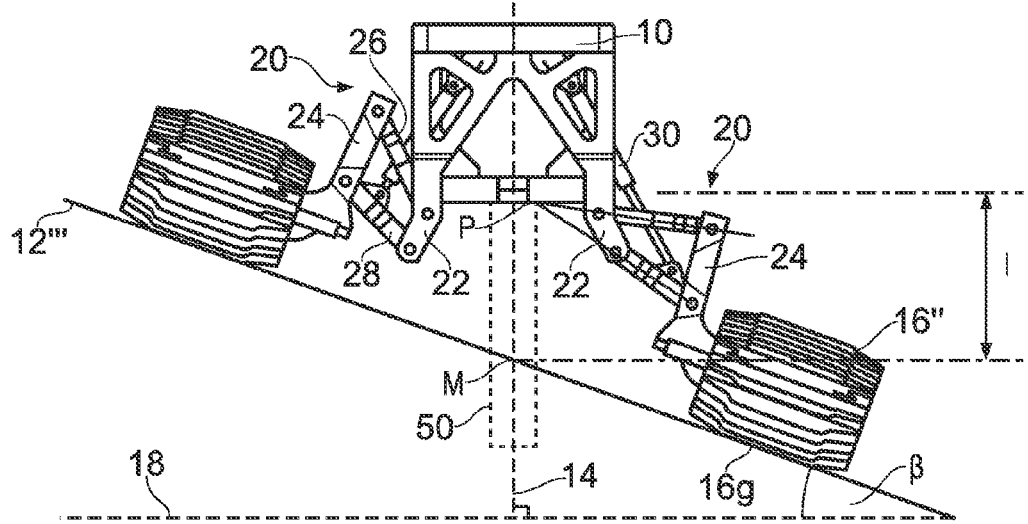
FIG. 3 is a schematic front view of a trenching apparatus of FIG. 1 when positioned on ground having a second lateral inclination greater than the first lateral inclination.

FIG. 3 illustrates schematically a trenching apparatus according to one embodiment of the invention disposed on ground (seabed) 12''' which has a lateral slope or incline indicated by angle β relative to a nominal horizontal line 18. Angle β is larger than angle α, the angle of inclination of the ground 12''' being greater than that of ground 12''. Nevertheless the suspension assemblies 20 can act to accommodate the slope of the ground 12''' so that the main body portion 10 remains in a substantially horizontal condition, with centre line 14 substantially vertical. Trench cutting equipment 50 can thus maintain its substantially vertical orientation.

Figure 4:
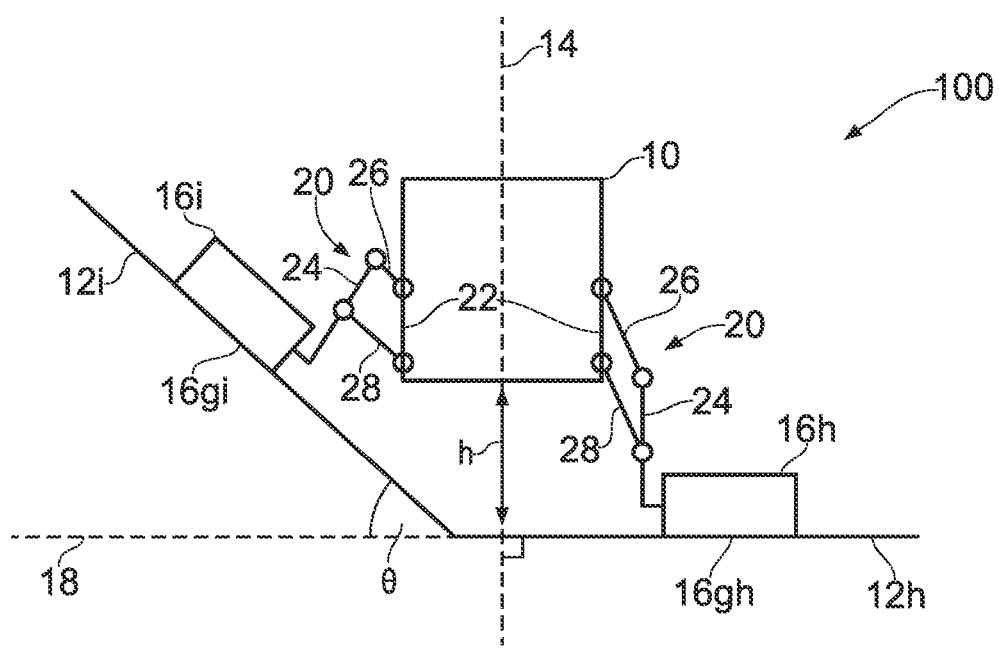
FIG. 4 is a schematic front view of a trenching apparatus, suitably an underwater trenching apparatus, similar to that of FIG. 1 when positioned on ground having a level portion and a laterally inclined portion.
Figure 5A:
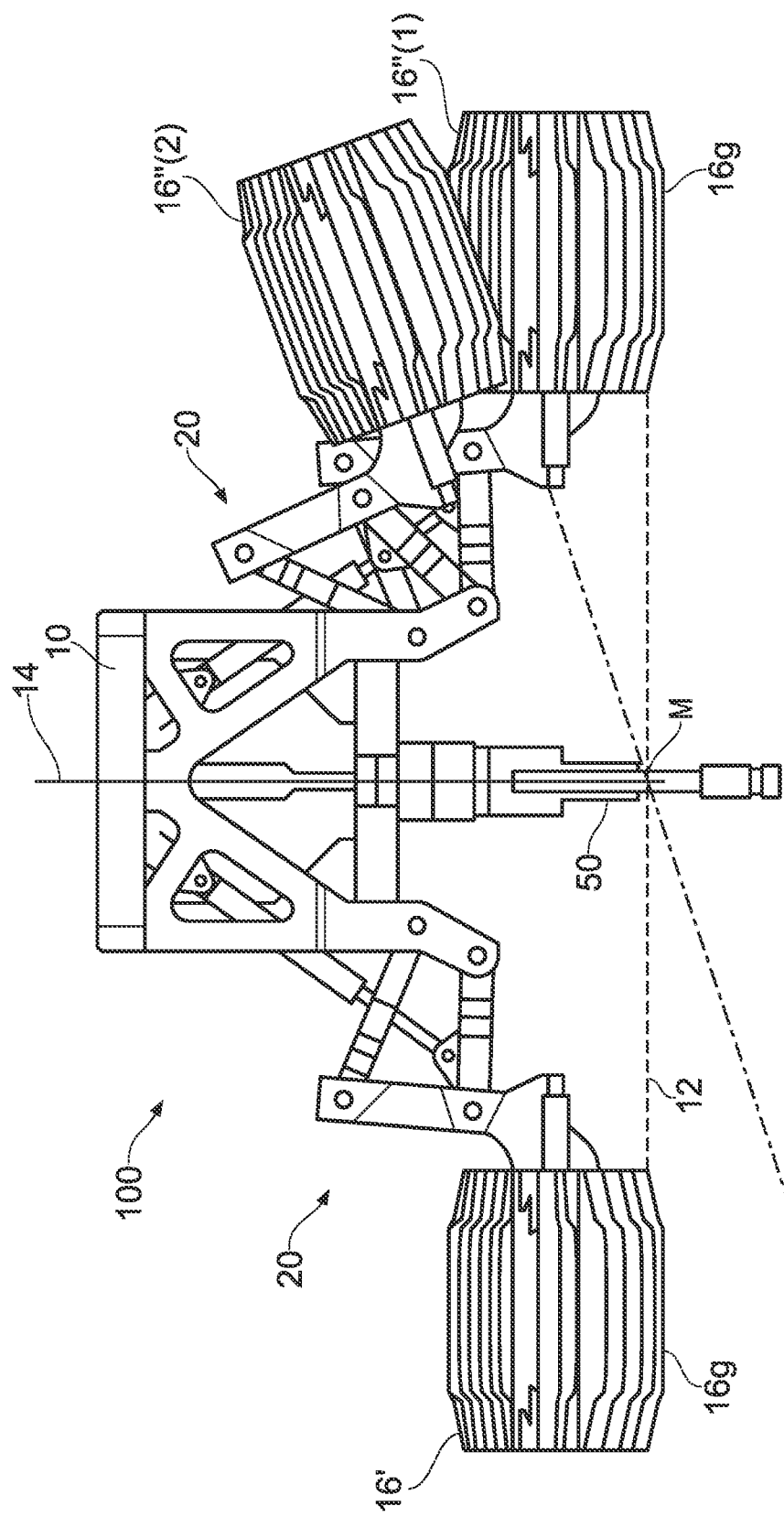
FIGS. 5a and 5b are views similar to FIGS. 1 to 3 showing a typical range of movement of a suspension assembly and associated ground contacting unit.
Figure 5B:
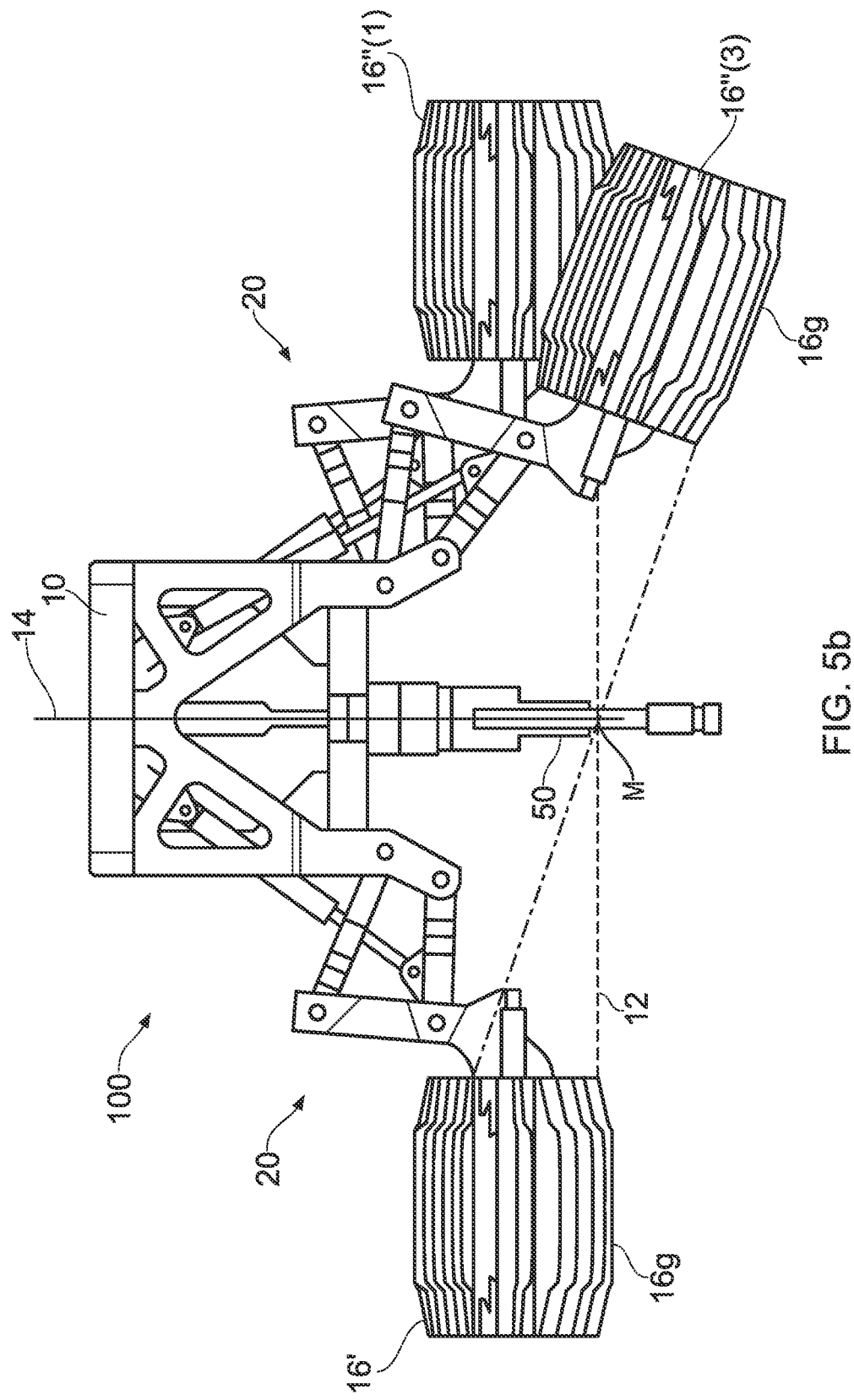

FIG. 4 illustrates schematically how the trenching apparatus 100, and in particular suspension assemblies 20, can accommodate different ground topographies. Thus in FIG. 4, ground contacting unit 16h rests on ground (seabed) part 12h which is nominally horizontal whereas ground contacting unit 16i rests on ground (seabed) part 12i which is inclined to the horizontal at an angle θ. Nevertheless the suspension assemblies 20 can act to accommodate the different slopes of the seabed parts 12h and 12i so that the main body portion 10 remains in a substantially horizontal condition, with centre line 14 substantially vertical. Trench cutting equipment 50 can thus maintain its substantially vertical orientation.

In each of FIGS. 1 to 3 it can be seen that the pivot point P of the respective suspension assemblies 20 lies substantially on the centre line 14 of the apparatus 100, which is also the centre line of the trench cutting equipment 50. This arrangement can ensure that the body portion 10 remains substantially horizontal (and consequently the trench cutting equipment 50 remains substantially vertical) irrespective of the attitude or instantaneous configuration of the suspension assemblies 20 as said assemblies accommodate changes in the ground surface. It is noted that the pivot point P can depart from exact coincidence with the centre line 14, notably towards the limits of movement of the suspension assemblies, that is, when the ground contacting unit 16 is at its uppermost or lowermost (FIG. 3) position.

Each ground contacting unit 16 can include a ground contacting face or portion 16g which contacts the ground (seabed) 12 below the respective ground contacting unit. In some preferred embodiments of the invention the suspension assemblies 20 are configured to change the angle of lateral inclination of the ground contacting portion 16g to complement or match the angle of lateral inclination of the underlying ground (seabed) 12. In this way, the area of contact of the ground contacting portion with the ground 12 can be maximised. In particular embodiments, the angle of lateral inclination of the ground contacting portion 16g is changed by changing the angle of lateral inclination of the ground contacting unit as a whole. In the exemplary configurations shown in FIGS. 1 to 3 it can be seen that in each case the angle of lateral inclination of the ground contacting portion 16g corresponds to the angle of inclination of the ground (seabed) 12. Specifically, in FIG. 1 the angle of lateral inclination of the ground contacting portion 16g in relation to the horizontal is 0 (since ground 12' is horizontal), in FIG. 2 the angle of lateral inclination of the ground contacting portion 16g in relation to the horizontal is α and in FIG. 3 the angle of lateral inclination of the ground contacting portion 16g in relation to the horizontal is β. In FIG. 4 the respective angles of lateral inclination of the ground contacting portions 16gh and 16gi are not the same, in order to accommodate the different slopes of the ground portions 12h and 12i respectively. Specifically, the angle of lateral inclination of the ground contacting portion 16gh in relation to the horizontal is 0 and the angle of lateral inclination of the ground contacting portion 16gi in relation to the horizontal is θ.

In some preferred embodiments the suspension assemblies 20 are configured such that the ground contacting portion 16g of each ground contacting unit pivots substantially about the point of intersection of the trench cutting equipment 50 (which in some preferred embodiments is also the longitudinal centre line 14 of the apparatus 100) with the ground (seabed). Such point of intersection is marked M in FIGS. 1 to 3 and 5a and 5b. With such an arrangement, movement of the trench cutting equipment 50 (in particular, lateral displacement and/or lateral angular movement) as a consequence of movement of the ground contacting units 16 over uneven topography is minimised or eliminated.

FIGS. 5a and 5b illustrate the range of available movement of a typical suspension assembly 20 and associated ground contacting unit 16". The same ground contacting unit 16" is shown in a range of positions. Position 16"(1) represents the median position, typically where the apparatus 100 rests on flat horizontal ground. In FIG. 5a, position 16"(2) represents a typical upper limit of movement of the ground contacting unit 16 provided by the suspension assembly 20 and in FIG. 5b, position 16"(3) represents a typical lower limit of movement of the ground contacting unit 16 provided by the suspension assembly 20. In each case, the ground contacting surface 16g pivots substantially about the point M at which the trench cutting equipment 50 intersects the ground 12 surface.

In some preferred embodiments the suspension assemblies are configured such that the distance (in particular the vertical distance) of the point M of intersection of the trench cutting equipment 50 (which in some preferred embodiments is also the longitudinal centre line 14 of the apparatus 100) with the ground (seabed) and the main body 10 of the apparatus 100 does not vary substantially as a consequence of movement of the ground contacting units 16 over uneven topography. Such distance is indicated by "l" in FIGS. 1 to 3. With such an arrangement vertical displacement of the trench cutting equipment 50 as a consequence of movement of the ground contacting units 16 over uneven topography is minimised or eliminated. Such vertical displacement can affect the depth of trench which is cut with the trench cutting equipment 50.

In one preferred arrangement, each independent suspension assembly 20 comprises a first suspension arm 22 mounted or otherwise arranged in fixed relation to the main body portion. Each independent suspension assembly can further comprise a second suspension arm 24 mounted or otherwise arranged in fixed relation to the ground contacting unit or to a mounting element, assembly or portion thereof. In some embodiments the ground contacting unit 16 can move relative to said mounting element, assembly or portion about a nominally vertical axis for steering and/or about a nominally horizontal lateral axis such as axis "A" in FIG. 1 to accommodate changes in the slope of the ground (seabed). The respective first and second suspension arms can each include first and second pivot points 22a,b, 24a,b. A first suspension pivot arm 26 can be pivotally attached at a first end to first pivot point 22a of the first suspension arm 22 and at a second end to first pivot point 24a of the second suspension arm 24. A second suspension pivot arm 28 can be pivotally attached at a first end to second pivot point 22b of the first suspension arm 22 and at a second end to second pivot point 24b of the second suspension arm 24. The respective first and second pivot points 22a, 24a, 22b, 24b of each independent suspension assembly 20 can define the corners of a convex quadrilateral and can thus form a construction conveniently referred to by those of skill in the art as a four bar linkage.

For each independent suspension assembly 20, an actuator 30 can be provided (not shown in FIG. 4). Each actuator 30 can extend between main body portion 10 and a moveable part (with respect to the main body portion 10) of the suspension assembly. In some preferred constructions the actuator 30 can be pivotally connected at an upper end 30u to the main body portion 10 and can be pivotally connected at a lower end 30m to said moveable part of the suspension assembly 20. In some preferred constructions, the moveable part of the suspension assembly 20 to which the actuator 30 can be connected can be a second (lower) suspension pivot arm 28. The actuators 30 can, in different embodiments be active or passive. In passive arrangements, the actuator 30 can act as a damper and the actuators can extend or retract in response to changes in the inclination of the underlying ground.

In some preferred constructions at least some of the actuators 30 are active. In these arrangements the actuators 30 can, for example, be hydraulic piston and cylinder arrangements. The extension and retraction of the actuators 30 can be controlled by a control apparatus (in particular, electronic control apparatus) in response to measured parameters of, or in relation to, the apparatus 100. In some preferred configurations, the apparatus 100 can be provided with one or more measurement devices such as an inclinometer, a gyroscopic device, an altimeter, ground profiling sonar or the like which can determine a positional condition of the apparatus 100 (e.g. the inclination of the main body portion 10) and/or the presence and characteristics of local features of the ground (such as angle of inclination, presence of ridges, size of boulders etc) over which the apparatus 100 is passing or will pass. In response to the output of such measurement devices received by the control apparatus, the actuators 30 can be actively adjusted by the control apparatus to maintain the trench cutting apparatus 50 in the desired vertical orientation. Where a trenching apparatus includes more than one pair of ground contacting units 16 some embodiments can provide active control of the actuators 30 only in respect of one such pair and the associated suspension arrangements 20.

In some constructions, an active means such as an actuator 30 (or additional actively controlled actuator, additional to passive actuator(s) 30) may act to offset the apparatus 100 from an equilibrium position otherwise adopted by the suspension arrangements 20.

A further advantage of the independent suspension arrangements 20 in the apparatus 100 of the invention lies in the ability of the independent suspension to change or alter the "ride height" of the apparatus 100 at any given time, that is, the spacing h, of the main body portion 10 from the ground, at any given time. Thus the suspension assemblies 20 can be adjusted such as by movement of actuators 30 to maintain a substantially constant and/or optimum ride height in relation to changing ground topography, or to maximize ground clearance when moving over particular obstacles such as rocks or boulders for example.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A trenching apparatus configured for cutting a trench extending downwardly from a ground surface, the apparatus comprising:
   a main body portion, trench cutting equipment depending from the main body portion,
   at least two ground contacting units arranged on opposed sides of the main body portion and on which the main body portion is supported, each ground contacting unit being connected to the main body portion by a respective independently operable suspension assembly, the respective suspension assemblies being configured to compensate for unevenness of the ground thereby to maintain the trench cutting equipment in a desired angular orientation with respect to the vertical,
   wherein each independent suspension assembly has a pivot center arranged substantially on a plane which longitudinally bisects the trench cutting equipment, said plane being a nominally vertical plane when the trenching apparatus stands on flat horizontal ground.

2. A trenching apparatus as claimed in claim 1 wherein each independent suspension assembly is configured such that a pivot center of each ground contacting unit is arranged substantially at the location where the trench cutting equipment intersects the ground surface.

3. A trenching apparatus as claimed in claim 1 wherein the respective suspension assemblies are configured substantially to prevent lateral displacement of the trench cutting equipment when the apparatus traverses uneven ground.

4. A trenching apparatus as claimed in claim 1 wherein said trenching apparatus is an underwater trenching apparatus configured for cutting a trench in a bed of a body of water.

5. A trenching apparatus as claimed in claim 1 wherein said desired angular orientation of the trench cutting equipment is a nominally vertical orientation.

6. A trenching apparatus as claimed in claim 1 wherein the trench cutting equipment is mounted in fixed relation, with respect to lateral angular displacement, to said main body portion of the trenching apparatus and said respective suspension assemblies being configured to maintain said main body portion in a desired angular orientation with respect to the horizontal thereby to maintain the trench cutting equipment in said desired angular orientation.

7. A trenching apparatus as claimed in claim 6 wherein said desired angular orientation of the main body portion is substantially horizontal.

8. A trenching apparatus as claimed in claim 1 further comprising for each independent suspension assembly an actuator mounted to the main body portion and to an element of the respective suspension assembly and configured to adjust the position of the respective suspension assembly, and consequently of the respective ground contacting unit with respect to the main body portion, thereby to compensate for said unevenness of the ground.

9. A trenching apparatus as claimed in claim 8 further comprising electronic control apparatus operative to effect adjustment of the actuator.

10. A trenching apparatus as claimed in claim 9 further comprising at least one measurement devices which can determine at least one of a positional condition of the apparatus, the presence and characteristics of local features of the ground over which the apparatus is passing, and the presence and characteristics of local features of the ground over which the apparatus will pass, and wherein said electronic control apparatus is operative to effect adjustment of at least one said actuator responsive to at least one outputs received from said at least one measurement devices.

11. A trenching apparatus as claimed in claim 1 wherein each suspension assembly comprises a first suspension arm arranged in fixed relation to the main body portion and including first and second pivot points, a second suspension arm attached to the ground contacting unit and including first and second pivot points, a first suspension pivot arm pivotally attached to the respective first pivot points of the first and second suspension arms and second suspension pivot arm pivotally attached to the respective second pivot points of the first and second suspension arms.

12. A trenching apparatus as claimed in claim 1 wherein each ground contacting unit comprises an endless track units configured to transmit tractive effort to move the trenching apparatus in use.

13. A trenching apparatus as claimed claim 1 wherein each ground contacting unit includes a ground contacting surface and wherein the respective suspension assembly can configure the lateral angle of inclination of the ground contacting unit such that the lateral angle of inclination of the ground contacting surface is substantially equal to the angle of inclination of the ground surface with which the ground contacting surface is in contact.

14. A trenching apparatus as claimed in claim 1 wherein the trench cutting equipment is selected from at least one jetting tool, at least one chain cutter, at least one auger, at least one rockwheel and a non-continuous cutter.

15. A trenching apparatus as claimed in claim 1 wherein the unevenness of the ground is, or includes, a lateral slope, with respect to a longitudinal forward direction of the apparatus.

16. A trenching apparatus as claimed in claim 1 wherein the unevenness of the ground is a local ground feature or formation.

17. A method of cutting a trench in a body of ground extending downwardly from the ground surface, the method comprising:
cutting said trench with a trenching apparatus comprising a main body portion, trench cutting equipment depending from the main body portion, at least two ground contacting units arranged on opposed sides of the main body portion and on which the main body portion is supported, each ground contacting unit being connected to the main body portion by a respective independently operable suspension assembly, the respective suspension assemblies each having a pivot center arranged substantially on a plane which longitudinally bisects the trench cutting equipment, said plane being a nominally vertical plane when the trenching apparatus stands on flat horizontal ground and while cutting said trench, adjusting the respective suspension assemblies to compensate for unevenness of the ground thereby to maintain the trench cutting equipment in a desired angular orientation with respect to the vertical.

18. A method of cutting a trench as claimed in claim 17 wherein a pivot center of each of the ground contacting units are arranged substantially at the location where the trenching cutting equipment intersects the ground surface.

19. A method as claimed in claim 17 wherein said adjusting is, during trench cutting operations, a substantially continuous adjusting in response to variations in the topography of the ground in which the trench is being cut.

20. A method as claimed in claim 17 wherein said adjusting of the respective suspension assemblies substantially prevents lateral displacement of the trench cutting equipment when the apparatus traverses uneven ground.

21. A method as claimed in claim 17 wherein said trench is a trench in a bed of a body of water.

22. A method as claimed in claim 17 wherein said adjusting of the respective suspension assemblies is effective to maintain the trench cutting equipment in a nominally vertical orientation.

23. A method as claimed claim 17 wherein the trench cutting equipment is mounted in fixed relation, with respect to lateral displacement, to said main body portion of the trenching apparatus and said respective independent suspension assemblies are adjusted to maintain said main body portion in a desired angular orientation with respect to the horizontal thereby to maintain the trench cutting equipment in the desired angular orientation.

24. A method as claimed in claim 23 wherein said desired angular orientation of the main body portion is substantially horizontal.

25. A method as claimed in claim 17 wherein for each suspension assembly the trenching apparatus further comprises an actuator mounted to the main body portion and to an element of the respective suspension assembly, the method further comprising operating said actuator to adjust a position of the respective suspension assembly, and consequently of the respective ground contacting unit, with respect to the main body portion, thereby to compensate for said unevenness of the ground.

26. A method as claimed in claim 25 wherein the apparatus further comprises electronic control apparatus and wherein said electronic control apparatus operatively causes adjustment of the actuator.

27. A method as claimed in claim 26 wherein the apparatus further comprises at least one measurement devices which is operable to determine at least one of a positional condition of the trenching apparatus, the presence and characteristics of local features of the ground over which the apparatus is passing, and the presence and characteristics of local features of the ground over which the apparatus will pass, and wherein said electronic control apparatus causes adjustment of at least one said actuator responsive to output received from said at least one measurement device.

28. A method as claimed in claim 17 wherein each ground contacting unit includes a ground contacting surface and wherein each suspension assembly configures the lateral angle of inclination of the respective ground contacting unit such that the lateral angle of inclination of the ground contacting surface is substantially equal to the angle of inclination of the ground surface with which the ground contacting surface is in contact.

29. A method as claimed in claim 17 wherein the trench cutting equipment is selected from at least one jetting tool, at least one chain cutter, at least one auger, at least one rockwheel and a non-continuous cutter.

30. A method as claimed in claim 17 wherein the unevenness of the ground is a lateral slope, with respect to a longitudinal forward direction of the apparatus when cutting a trench.

31. A method as claimed in claim 17 wherein the unevenness of the ground is a local ground feature or formation.

* * * * *